UNITED STATES PATENT OFFICE.

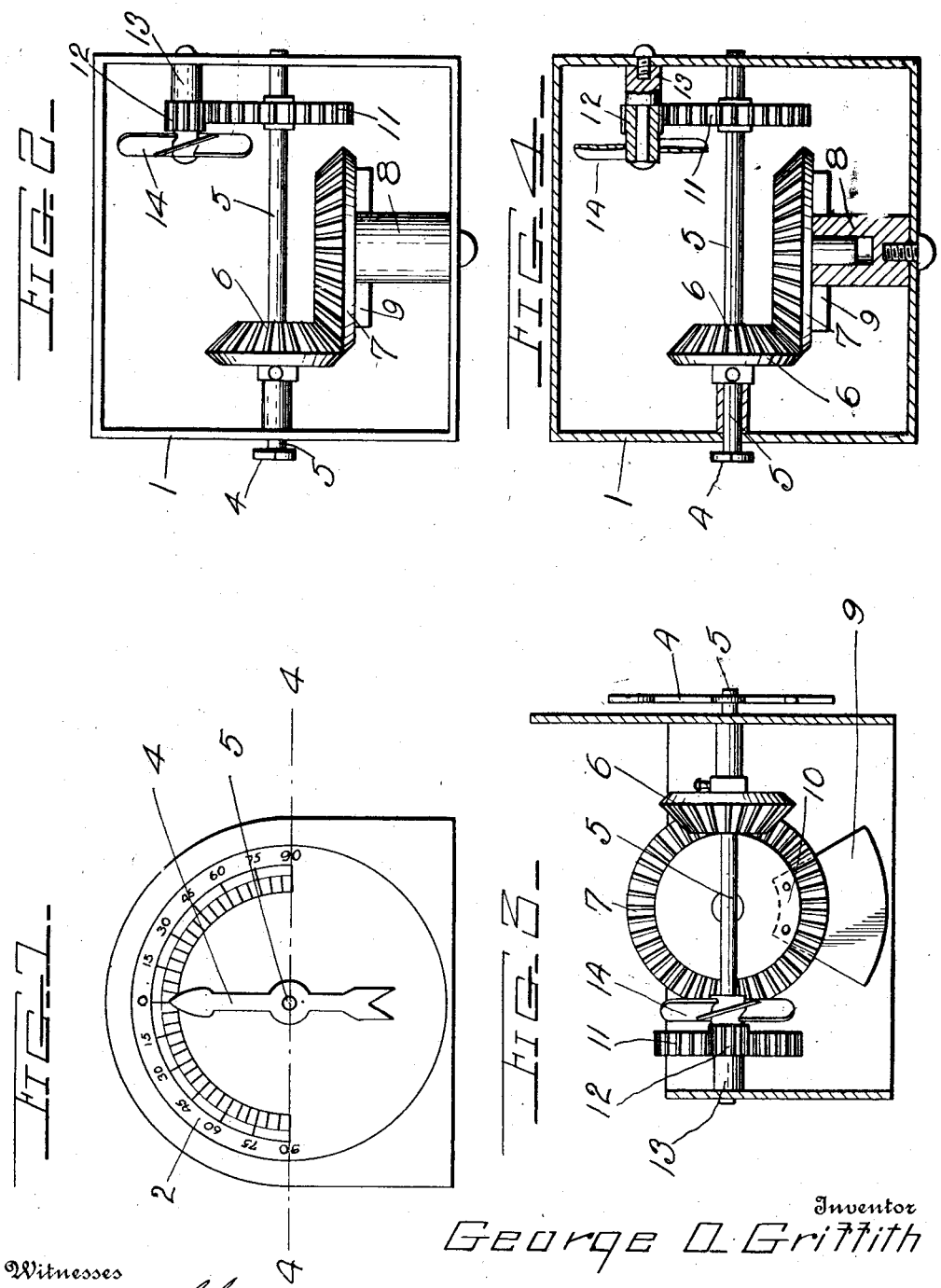

GEORGE O. GRIFFITH, OF EAST AUBURN, CALIFORNIA.

GRADOMETER.

1,055,902.   Specification of Letters Patent.   Patented Mar. 11, 1913.

Application filed December 19, 1911. Serial No. 666,690.

*To all whom it may concern:*

Be it known that I, GEORGE O. GRIFFITH, a citizen of the United States, residing at East Auburn, in the county of Placer and State of California, have invented new and useful Improvements in Gradometers, of which the following is a specification.

This invention relates to certain novel and useful improvements in gradometers and has particular application to a measuring instrument of the class described adapted to be attached to an automobile, or other vehicle for measuring the grades of hills or other elevations along which the vehicle may travel.

In carrying out my invention, it is my purpose to provide a simple, compact, reliable and efficient measuring instrument which is of such a compact form that it may be readily and conveniently attached to the dash board of the vehicle and which, furthermore, will enable the driver to make accurate readings of the grade over which he is traveling, so that he may ascertain at a glance the degree of the grade either in traveling up or down hill.

With the above-recited objects, and others of a similar nature in view, the invention consists in the construction, combination and arrangement of parts, set forth in and falling within the scope of the appended claim.

In the accompanying drawings:—Figure 1 is a view in front elevation of a device embodying my invention. Fig. 2 is a top plan view with the top of the casing removed. Fig. 3 is a view in side elevation with the side of the casing removed. Fig. 4 is a vertical cross sectional view taken on the line 4—4 of Fig. 1.

Referring to the accompanying drawing in detail, the numeral 1 indicates a casing of any suitable and approved construction, the front of which is provided with a measuring dial 2 having a suitable grade scale marked thereon.

In the present instance, the level mark or neutral point is indicated at zero, while one side of the marking scale is provided to indicate "up-grade" and the opposite side is similarly marked to indicate "down-grade".

The numeral 4 indicates a pointer adapted to move freely and easily over the dial and occupying a neutral zero position when the vehicle is on the level. This pointer is secured to one end of the main shaft 5 extending through the casing from the front to the rear thereof, said shaft being revolubly mounted in the casing so as to turn freely. Carried by the main shaft 5 is a beveled gear 6 meshing with the relatively large bevel gear 7 carried by the shaft 8, said shaft being rigidly connected to the side of the casing while the large gear 7 is free to rotate upon the end of the shaft. The numeral 9 indicates a weight somewhat in the nature of plumb weight which is connected to the back of the large gear 7 as at 10 so that the force of gravity normally holds said weight in a perpendicular position. The shaft 4 is also provided with a small gear 11 meshing with the pinion 12 carried by the stud shaft 13 mounted in the back of the casing, a small fan 14 being connected to the pinion. This fan pinion and gear wheel is employed as a regulator, that is, to cause the indicator to turn regularly but steadily and to avoid the latter being subjected to jars and shocks which the vehicle would encounter in traveling over rough places.

From the above description, taken in connection with the accompanying drawing, it will be apparent that the casing is secured to the dash board of the vehicle with the indicator facing the operator. As the vehicle travels "up-grade" the weight swinging off center turns the larger gear wheel 7 which, in turn, operates the bevel gear on the shaft or moves the indicator point over the scale marked "up-grade" to indicate the degree of grade over which the vehicle is traveling. Similarly, if the vehicle is traveling "down-grade", the weight swings in the opposite direction and the indicator point is moved over the scale marked "down-grade" to an extent indicative of the pitch of such grade. It will be noted that the regulating device consisting of the fan, the pinion, and the gear on the main shaft meshing with the pinion acts to prevent the regulator jumping or moving suddenly over the scale, but causes the latter to travel in a regular steady, easy path.

It will be seen that I have provided a type of gradometer which embraces comparatively few parts and those not liable to be injuriously affected by the ordinary jars and shocks to which the vehicle is subjected in travel. Furthermore, the device forming, as it does, a small compact structure which may be readily attached to the vehicle in such position as not to interfere with the operating mechanism or other attachments ordinarily found upon the dash board and at the same time will be in position readily readable by the driver.

I claim:—

A gradometer comprising a casing having a dial formed on the outer surface of one of the walls thereof, an indicator pointer movable over said dial, a shaft rotatably mounted in said casing and connected to said pointer, a gear mounted on said shaft, a second shaft mounted in the casing and secured to one side wall thereof, a gear rotatably mounted on the said second shaft and meshing with the gear on the first-mentioned shaft, a pendulum weight carried by said second-named gear, and a regulating device comprising a gear upon the first-mentioned shaft, a pinion meshing with said gear, and a fan connected to said pinion.

In testimony whereof I affix my signature in presence of two witnesses.

GEORGE O. GRIFFITH.

Witnesses:
JAMES WESTFALL,
RICHARD SNYDER.

Copies of this patent may be obtained for five cents each, by addressing the "Commissioner of Patents, Washington, D. C."